United States Patent
Hanson et al.

(10) Patent No.: US 7,657,613 B1
(45) Date of Patent: Feb. 2, 2010

(54) HOST-CENTRIC STORAGE PROVISIONER IN A MANAGED SAN

(75) Inventors: Jeffrey A. Hanson, Westminster, CO (US); Paul B. Monday, Highlands Ranch, CO (US); Brandon E. Taylor, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 877 days.

(21) Appl. No.: 10/937,184

(22) Filed: Sep. 9, 2004

(51) Int. Cl.
*G06F 15/16* (2006.01)
(52) U.S. Cl. .................. 709/220; 709/229; 707/10
(58) Field of Classification Search ............. 709/209, 709/211–217, 229, 215, 226, 220, 221; 711/147, 711/159, 154, 173; 707/10
See application file for complete search history.

(56) References Cited

U.S. PATENT DOCUMENTS

| | | | |
|---|---|---|---|
| 6,801,992 B2 | 10/2004 | Gajjar et al. | |
| 6,839,746 B1 * | 1/2005 | Muthiyan et al. | 709/220 |
| 7,203,730 B1 * | 4/2007 | Meyer et al. | 709/213 |
| 7,272,848 B1 * | 9/2007 | Meyer et al. | 726/1 |
| 2002/0156987 A1 * | 10/2002 | Gajjar et al. | 711/203 |
| 2002/0188711 A1 * | 12/2002 | Meyer et al. | 709/223 |
| 2003/0037127 A1 * | 2/2003 | Shah et al. | 709/220 |
| 2005/0108375 A1 * | 5/2005 | Hallak-Stamler | 709/223 |

OTHER PUBLICATIONS

"CreekPath Suite Solution Brochure," www.creekpath.com/products_solution, Jun. 23, 2004, (3 Pages).
Hyrne et al., "Process Automation on the Storage Supply Chain—A Different Approach to Storage Management," Invio Software, Inc., Oct. 2, 2003.
"CreekPath Suite Solution Overview—CreekPath Suite 3.0," CreekPath Systems, Oct. 2, 2003, (8 Pages).
Mike Koclanes, "SRM Workflow and Automation—Storage Management," Computer Technology Review, Feb. 2003, (3 Pages).

* cited by examiner

*Primary Examiner*—Moustafa M Meky
(74) *Attorney, Agent, or Firm*—Robert C. Kowert; Meyertons, Hood, Kivlin, Kowert & Goetzel, P.C.

(57) ABSTRACT

Various embodiments of a system and method for provisioning a storage consumer with storage in a SAN networked computer system are disclosed. A SAN networked computer system may include one or more consumers of storage, such as host computers, a plurality of storage devices, and one or more SAN fabrics including the devices needed to connect the storage consumers to the storage devices. The system may also include a storage consumer-centric storage provisioner. To provide a storage consumer with storage, the storage consumer-centric storage provisioner may perform discovery on the system to acquire topologic information on the system along with the characteristics of system components. The storage provisioner may contextualize the information into the perspective of the storage consumer to present a user with candidate system configuration parameters from which to select, and when sufficient parameter selections have been input, the provisioner may configure the system according to the user selections.

30 Claims, 9 Drawing Sheets

HOST-CENTRIC STORAGE PROVISIONER IN A MANAGED SAN

BACKGROUND OF THE INVENTION

1. Field of the Invention

The invention relates to computer systems, and more particularly to provisioning storage in computer systems including a SAN.

2. Description of the Related Art

SAN architecture places storage on its own dedicated network, removing data storage from both a direct attached server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

Of major concern in systems implementing SANs may be storage provisioning. Storage provisioning may be defined as the procedure used to transition unallocated storage on a connected and available storage device to a state in which it is ready for use by a given host connected to the same SAN. In a typical configuration, a dozen or more individual procedures may need to be performed to provision storage, some of which may require the use of disparate tools and/or data included in a variety of user manuals or other sources.

For example, some of the first procedures to be performed in storage provisioning may be identifying characteristics of the host consumer along with the desired characteristics of the storage to be allocated in terms of size and availability. A host-based tool that includes information on applications running on the storage-consuming host may be used to generate the required storage characteristics. During a subsequent phase of provisioning, it may be necessary to locate a storage device on the SAN, which supports the desired storage characteristics and is capable of dynamically creating a volume of the required type. For these determinations, a tool containing topologic information about the SAN and detailed descriptions of individual storage devices may be required. Several such tools may be used to complete host storage provisioning.

Typically, the types of tools described above do not share data or context, do not provide a similar look and feel to the user, and do not share a user access point. Each tool may provide a different perspective and representation of the data and concepts relevant to its procedure. Because the procedures of the different tools are linked and have dependencies in storage provisioning, the user must manually transfer context and data among the tools in a typical SAN environment.

SUMMARY

Various embodiments of a system and method for provisioning a storage consumer with storage in a SAN networked computer system are disclosed. A SAN networked computer system may include one or more consumers of storage, such as host computers, a plurality of storage devices, and SAN fabrics including the devices needed to connect the storage consumers to the storage devices. The system may also include a storage consumer-centric storage provisioner. To provide a storage consumer with storage, the storage consumer-centric storage provisioner may perform discovery on the system to acquire topologic information on the system along with the characteristics of system components. The storage provisioner may contextualize the information into the perspective of the storage consumer to present a user with candidate system configuration parameters from which to select, and when sufficient parameter selections have been input, the provisioner may configure the system according to the user selections.

To contextualize the system information gathered during the discovery process, storage consumer-centric storage provisioner may disregard data on system components that are not accessible by or available to the storage consumer. For example in a system including multiple SAN fabrics, a selected storage consumer may only be coupled to one of the fabrics. The storage consumer-centric storage provisioner may disregard data one fabrics other than the one to which the selected storage consumer is coupled. In this way the user may not be presented with extraneous choices when he is requested to select values for system configuration parameters. In one embodiment, the storage consumer may be a host and the host-centric storage provisioner may disregard data on system components that are not connected to the host. In other embodiments the storage consumer may be an application or a cluster of servers. In each case, the storage consumer-centric storage provisioner may only present the user with options that are pertinent to an allowable configuration for providing SAN storage to the storage consumer.

When a system administrator or other user needs to provide storage for a storage consumer, the storage consumer-centric storage provisioner may support the identification of required system resources including: the storage consumer, a storage device or devices to provide the storage, an initiator port on the storage consumer, a target port on the providing device, a LUN on the providing device, and a SAN zone to include the consumer and provider.

For each type of system resource, whose selection the storage consumer-centric storage provisioner supports, it may identify system resources of that type based on the data that was obtained during the discovery process, filter the resources based on the system topology to eliminate those resources that are not reachable by the consumer, present the viable candidate resources to the user, and input the designation of the resource selected by the user.

This procedure may be repeated for each system resource needed to perform the storage provisioning. In one embodiment, the storage consumer-centric storage provisioner may perform partial system configuration following a user resource selection. For example, when the user has selected a particular storage device to provide storage to the consumer, the provisioner may create the required volume on that storage device. In other embodiments, the storage consumer-centric storage provisioner may perform system configuration only after all required system resources have been selected by the user.

BRIEF DESCRIPTION OF THE DRAWINGS

A better understanding of the present invention can be obtained when the following detailed description is considered in conjunction with the following drawings, in which.

Figure 1:
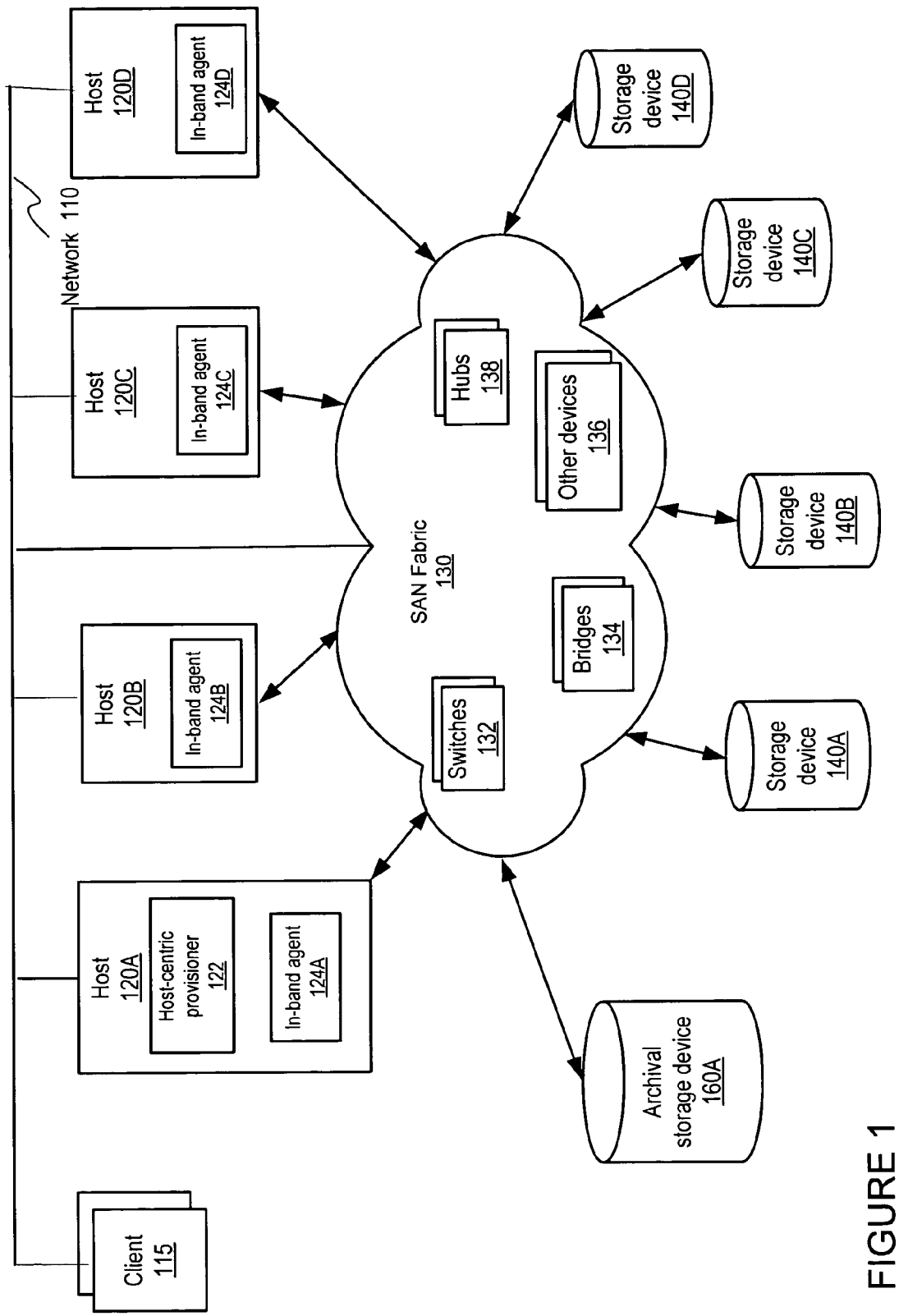
FIG. 1 illustrates an exemplary SAN system capable of implementing embodiments of storage consumer-centric storage provisioning, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 illustrates an exemplary SAN system capable of implementing embodiments of storage consumer-centric storage provisioning, according to one embodiment. A SAN may be a high-speed network that enables fast, reliable access among host/servers 120 and storage resources 140. A SAN may be used to connect servers to storage devices, servers to each other, and storage devices to other storage devices through combinations of hubs 138, switches 132, bridges 134, and/or other devices 136 collectively referred to as a SAN Fabric 130.

A hub 138 may perform a repeater function, which is to amplify and/or regenerate a received signal and provide it at multiple outputs. A hub takes the data that comes into one port and sends it out all other ports that are included in the hub. It doesn't usually perform any filtering or redirection of data. In contrast, a switch 132 takes the data that comes into one port, reads the destination address for that data and sends it out on just the one port that corresponds to the destination address. Bridges 134 are useful for joining networks made of different media types or protocols together into larger networks, and keeping network segments free of data that doesn't belong in a particular segment. Bridges 134 may join networks or network segments, which use different protocols. In such cases, the bridge may perform lower layer translation on the packets that it transfers from one network to another.

A given SAN may include any number of the components described above depending on the number of host/servers and storage devices that it will interface. In some embodiments, the SAN may include only a subset of the types of SAN fabric components. Storage devices 140 and 160 may include one or more of, but are not limited to, RAID (Redundant Array of Independent Disks) systems, disk arrays, JBODs (Just a Bunch Of Disks, used to refer to disks that are not configured according to RAID), tape devices, and optical storage devices. Each host/server 120 is typically connected to one or more fabrics 130 via one or more Host Bus Adapters (HBAs). SAN fabrics 130 may enable server-to-storage device connectivity through Fibre Channel switching technology. SAN fabrics 130 hardware may include one or more fabric components, as described above, as well as the interconnecting cables (for Fibre Channel SANs, fibre optic cables).

Host/servers 120 may be any of various types of devices, including, but not limited to, personal computer systems, desktop computers, laptop or notebook computers, mainframe computer systems, workstations, network appliances, network computers, Internet appliances, or other suitable devices. Host system 120A may include at least one processor. The processor may be coupled to a memory. Memory is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

SANs may be implemented using a wide variety of technologies. The technology options for a SAN may include: Enterprise Systems Connection (ESCON), Fiber Distributed Data Interface (FDDI), Ethernet/TCPIP, Asynchronous Transfer Mode (ATM), IBM's Serial Storage Architecture (SSA), and Fibre Channel. SAN architectures may also implement a number of underlying protocols, including TCP/IP and variants of SCSI (Small Computer System Interface). One of the most popular implementation of SAN for open systems is based on SCSI over Fibre channel. Fibre Channel Protocol (FCP) specifies how to run the SCSI command set over a dedicated Fibre Channel optical fabric. In direct server attached storage, a local SCSI controller on a peripheral bus fulfills a data request initiated by a SCSI driver in the host server. On a SAN, a Fibre Channel host bus adapter (HBA) may replace the SCSI controller in each server 120 to connect to the SAN fabrics 130, which in turn may connect to disk arrays, tape drives, and other storage devices. A LUN (logical unit number) is the SCSI identifier of a logical unit within a target, the system component that receives a SCSI I/O command. A logical unit is an entity within a SCSI target that executes I/O commands.

SCSI I/O commands are sent to a target and executed by a logical unit within that target. A SCSI physical disk typically has a single logical unit. Tape drives and array controllers may incorporate multiple logical units to which I/O commands can be addressed. Each logical unit exported by an array controller may correspond to a virtual disk. SAN fabrics 130 may be implemented, for example, in accordance with the Fibre Channel Switch Fabric-2 (FC-SW2) open standard specification to provide redundancy and ensure high data availability. SANs may be deployed in both homogeneous and heterogeneous environments. In a heterogeneous environment, a SAN may allow different kinds of servers, e.g. Windows NT, UNIX, and OS/390, to share different kinds of storage, e.g. mainframe disk, tape, and redundant arrays of inexpensive disks (RAID). With this shared capacity, organizations may be able to acquire, deploy, and use storage devices more cost-effectively.

When a host 120 undergoes startup or encounters changes in its workload, it may require additional storage from devices 140 and 160 attached to the SAN fabrics 130. An administrator may use host-centric storage provisioner 122 to reconfigure the system to perform the required storage allocation. A host is frequently used herein as an example of a storage consumer for which storage provisioning in a SAN may be desired. However, the storage consumer-centric functionality of the storage provisioner described herein may be applied for other consumer entities or entities at other levels of abstraction, such as an application or a cluster. Thus, the terms "host-centric" and "consumer-centric" are used interchangeably herein.

The storage provisioner 122 may use both in-band and out-of-band communications to obtain system information required for the requested storage allocation. The term "in-band" may refer to communications that take place over the SAN fabrics 130, while "out-of-band" may indicate communications over network 110. Each SAN-connected host 120 may include an in-band agent 124 that supports storage provisioner 122 in system data collection.

Figure 2:
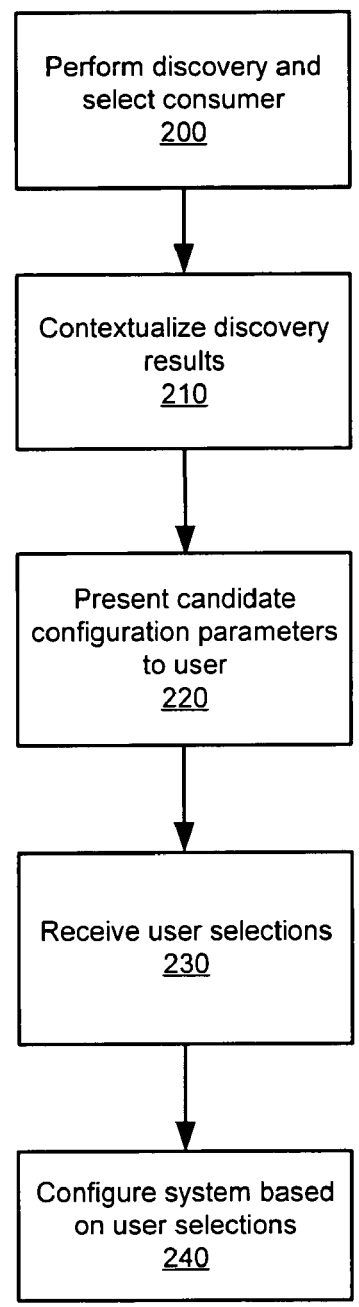
FIG. 2 is a flow chart for a storage consumer-concentric storage provisioner provisioning storage to a storage consumer, according to one embodiment.

FIG. 2 is a flow chart for a storage consumer-concentric storage provisioner provisioning storage to a storage consumer, according to one embodiment. When invoked by a system administrator or other user, as indicated a block 200, the storage provisioner may perform discovery to acquire information about the system needed to properly allocate storage from SAN storage devices to a selected consumer. In one embodiment, the storage provisioner may make use of both in-band and out-of-band agencies to acquire knowledge of the complete system. At block 210 the information collected during discovery, may be contextualized to the perspective of the storage consumer. In the case where the storage consumer is a host, the system data may be contextualized to the perspective of that host. For example, if the specified host can only access half of the SAN storage devices, system reconfiguration options in which inaccessible storage devices are configured to provide storage to the host are removed from consideration. This contextualizing of system data to the perspective of the storage consumer may make the provisioning process more efficient.

Portions of the contextualized system information may be presented to the administrator, as shown in block 220, to allow for the selection of system configuration parameters. For example, the storage characteristics of accessible storage devices may be displayed on an administrative console display to allow the administrator to select the size of storage to allocate to the host, as indicated by block 230. In response to user selections, the storage provisioner may perform additional filtering on the contextualized system information to further narrow the field of system configuration parameters. For example, once the administrator has selected the desired storage size, some candidate storage devices may be eliminated because they are unable to support requirements for storage of that particular size. Once again the elimination of extraneous parameters may add to the efficiency of storage provisioning. When all necessary system configuration parameters have been selected by the administrator, the storage provisioner may use these selections along with elements of the contextualized system data to reconfigure the system to allocate storage on the selected device to the host, as shown in block 240.

Figure 3:
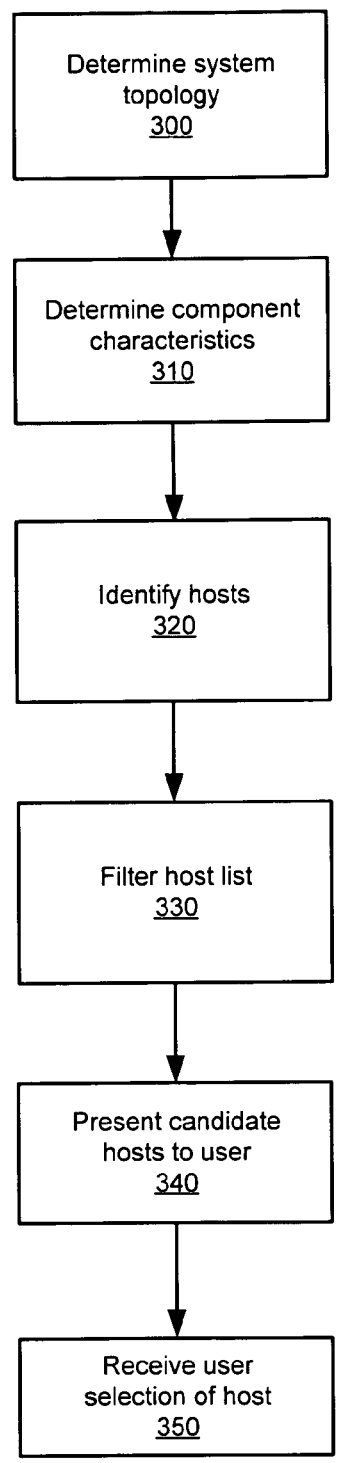
FIG. 3 is a flowchart for performing discovery and selecting a host for storage provisioning, according to one embodiment.

In the following sections, several aspects of storage consumer-centric storage provisioning will be discussed in greater detail. FIG. 3 is a flowchart for performing discovery and selecting a host for storage provisioning, according to one embodiment. At 300, the host-centric storage provisioner may perform discovery to determine the topology of the system. In one embodiment, characteristics of system components may be obtained during the discovery process, as indicated by block 310. In other embodiments, collection of information on the characteristics of system components may occur before or after the topological information has been obtained. During discovery, the storage provisioner may use the in-band agent in its host to communicate with the devices included in the SAN fabrics as well as storage devices, hosts, and other devices connected to the SAN fabrics. For example, the in-band agent may acquire information from fabric switches and hubs to determine their settings and connections and therefore, what end devices may be accessed through these devices from a given host. As each in-band agent contributes its connectivity information to the storage provisioner, a complete picture of the SAN topology may be built up.

In addition to SAN topological information, the storage provisioner may also collect information on the LAN and its connected components during the discovery process. The hosts, some SAN fabric components, and client computers may include LAN connections for communications. The storage provisioner may use out-of-band communications to acquire topological information on system components connected to the LAN. In one embodiment, hosts may include out-of-band agents corresponding to the in-band agents described previously for collecting information on LAN-connected devices. When the information collected by both in-band and out-of-band agents is assembled and correlated, the components and connectivity of the entire system may be available to the storage provisioner.

As was mentioned previously, during discovery or shortly thereafter, the storage provisioner may acquire information on the characteristics of various system components, as indicated by block 310. This information may include such things as capacity and other parameters for storage devices, data transfer rates for SAN fabric components, and available ports in the case of hosts. In one embodiment, the storage provisioner may store topological and component characteristic information and make use of it throughout the provisioning process.

The invocation of the storage provisioner by an administrator or other system user may indicate an initial or additional need for storage on the part of a system component that is a storage consumer. Hosts, applications, and clusters are some examples of types of storage consumers to which storage provisioning may be made centric. An application may require additional storage at any time during its execution. Under normal circumstances the OS in the machine running the application provides additional storage, as requested, to the application and recovers the storage when the application no longer needs it. In the case of a multi-tasking OS, several applications may execute simultaneously and compete for system resources such as storage. In such an environment, a point may be reached where an application requests additional storage, but the OS is unable to accommodate the request because it has previously allocated all the storage currently available to the machine. Likewise, if a host is already running several applications using nearly all of its available storage and a user attempts to start yet another application, the host may require that it be provided with additional storage.

In the case that the storage consumer is a host, it may be understood that the storage is to be provided from one or more storage devices accessible to the host through the SAN fabrics. From the information obtained during the discovery process, the storage provisioner may identify hosts in the system, as depicted in block 320. By examining the system topological data, the storage provisioner may determine that some of the hosts are either not coupled to the SAN fabrics or are coupled but are not connected in such a way as to be able to access available storage devices. Since hosts in either of these categories cannot be the target for SAN storage provisioning, the storage provisioner may remove these hosts from consideration, as shown in block 330. The remaining set of hosts may be both connected to the SAN fabrics and capable of accessing one or more available SAN-connected storage devices and thus are candidates for storage provisioning. At block 340, the list of candidate hosts may be presented to the administrator, from which he may select a storage-provisioning target, as indicated by block 350. The elimination of extraneous choices from the list presented to the user may be referred to as contextualization, and may make the storage-provisioning process more efficient.

Figure 4:
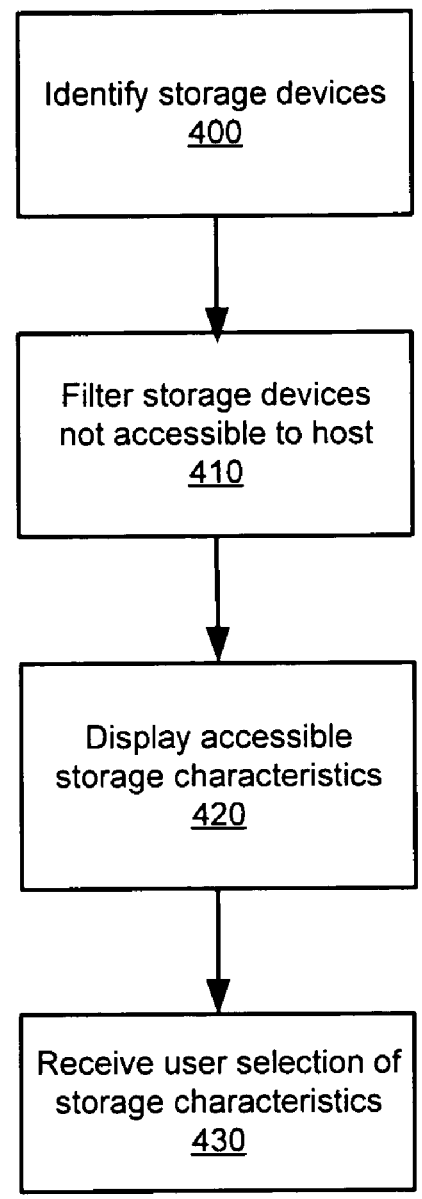
FIG. 4 is a flowchart of a method for determining desired storage characteristics, according to one embodiment.

FIG. 4 is a flowchart of a method for determining desired storage characteristics, according to one embodiment. Once the user has selected a target storage consumer for provisioning, the storage provisioner may reference the system data obtained during discovery to identify all storage devices, as shown in block 400. The list of storage devices may be contextualized to include only those storage devices, which are accessible by the host previously selected by the user, in block 410. By limiting the data presented to the user to that which is pertinent to the selected host, the storage provisioner may be said to operate in a "host-centric" fashion. Thus, in one embodiment, the storage provisioner may be referred to as a host-centric storage provisioner, and more generally as a storage consumer-centric storage provisioner.

When the list of storage devices has been contextualized to the perspective of the selected target host, the storage provisioner may reference the characteristics of each listed storage device collected during discovery and prepare a group of options for storage characteristic available to the target host. For example, some of the listed storage devices may have different fault tolerance/availability (RAID) levels and sizes than other listed storage devices. All distinct combinations of characteristics for storage accessible to the target host may be presented to the user, as shown in block 420. The user may then select the desired storage capabilities from those displayed, as indicated by block 430. Limiting presented selections based on discovered capabilities of storage devices may increase system configuration efficiency by eliminating consideration of invalid configuration options.

Figure 5:
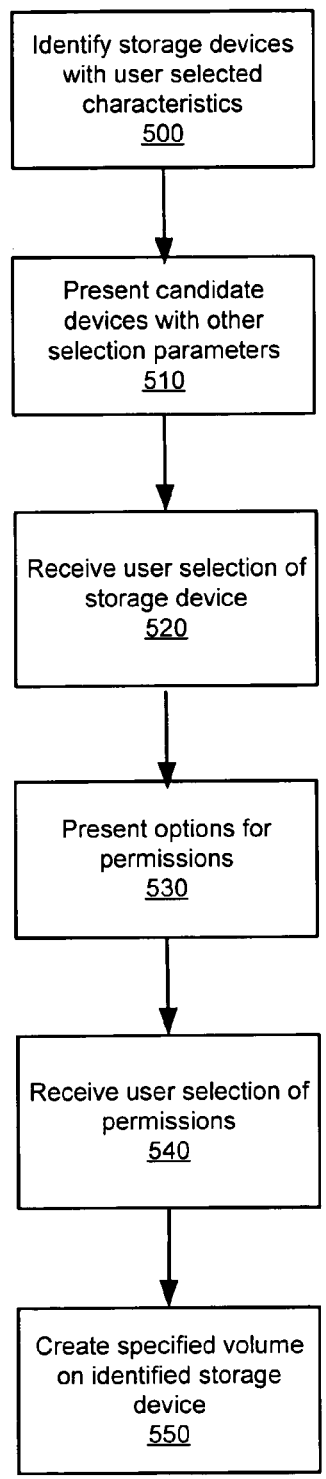
FIG. 5 is a flowchart of a method for selecting a source storage device to provide storage to a target host, according to one embodiment.

FIG. 5 is a flowchart of a method for selecting a source storage device to provide storage to a target host, according to one embodiment. At 500, the host-centric storage provisioner may use the storage characteristics selected by the user to compile a list of candidate storage devices. If multiple storage devices can provide the desired storage capabilities, the host-centric storage provisioner may present the candidates to the user along with other pertinent characteristics for each candidate device, as indicated by block 510. The user may also possess information about the system pertinent to the selection of a source storage device. For example, the user may know that under normal operating conditions, some of the SAN fabric devices are quite heavily loaded, while others are relatively free. The user may make use of this information to select a source storage device, as indicated in block 510, whose access path from the target host is not the shortest, but whose resulting message traffic will contribute least to overall SAN congestion. Once the source storage device is selected, the host-centric storage provisioner may reference data on the characteristics of this particular device acquired during discovery to determine its supported permissions. These may be presented to the user, as illustrated in block 530, to allow him to select those that are desired, as shown by block 540. With the incorporation of the user selections described above with the system information collected during discovery, the host-centric storage provisioner may create a storage volume with the required characteristics on the selected storage device, as indicated in block 550 without further user input.

Figure 6:
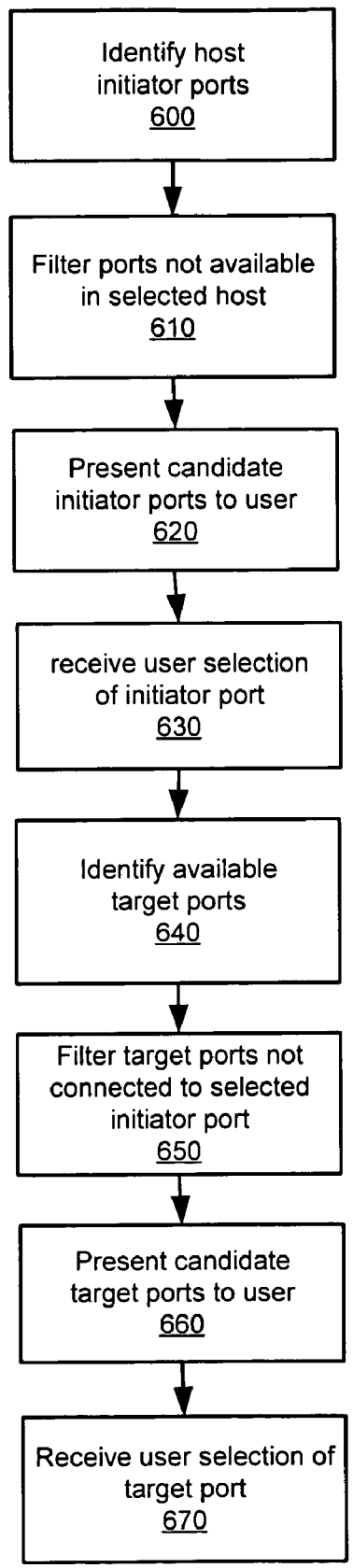
FIG. 6 is a flow chart for a method of selecting initiator and target ports for host storage provisioning, according to one embodiment.

FIG. 6 is a flow chart for a method of selecting initiator and target ports for host storage provisioning, according to one embodiment. At 600, the host-centric storage provisioner may identify host initiator ports from information collected during discovery. The process of selecting an initiator port may be facilitated by the host-centric storage provisioner performing port data contextualization, e.g. eliminating those initiators, which are not available on the selected host, as indicated in block 610. The host-centric storage provisioner may then present only valid initiator port candidates to the user, as indicated by block 620. In one embodiment, the discovery process may include the collection of initiator port information on each host by means of an API, which obtains the desired information from the host OS. As in previously discussed user selection processes, presenting the user with a target host-centric list of options may increase the efficiency of the initiator port selection process, as shown in block 630.

Communications over the SAN may require a target port on the selected storage device corresponding to the previously selected initiator port. Analogously to selecting the initiator port, the host-centric storage provisioner may identify target ports on the selected storage device from information collected during discovery, as illustrated in block 640. The set of candidate ports on the storage device may be contextualized by including only those ports, which have physical connectivity to the selected initiator port, as indicated by block 650. The information on which this contextualization is based may include the system topological information collected during the discovery process. The list of candidate target ports may be displayed to the user, as shown in block 660, and from this, the user may efficiently select a port without the need to consider extraneous choices.

In one embodiment, multiple initiator/target port pairs may be selected for a given host/storage device pair. These initiator/target port pairs may represent redundant communication channels between the selected host and storage device. The use of redundant communication channels between the selected host and storage device may increase the reliability, availability, and/or performance of the storage from the perspective of the host. The subsequent steps of LUN selection/masking/mapping and zoning (as detailed below) may be performed for each selected initiator/target port pair.

Figure 7:
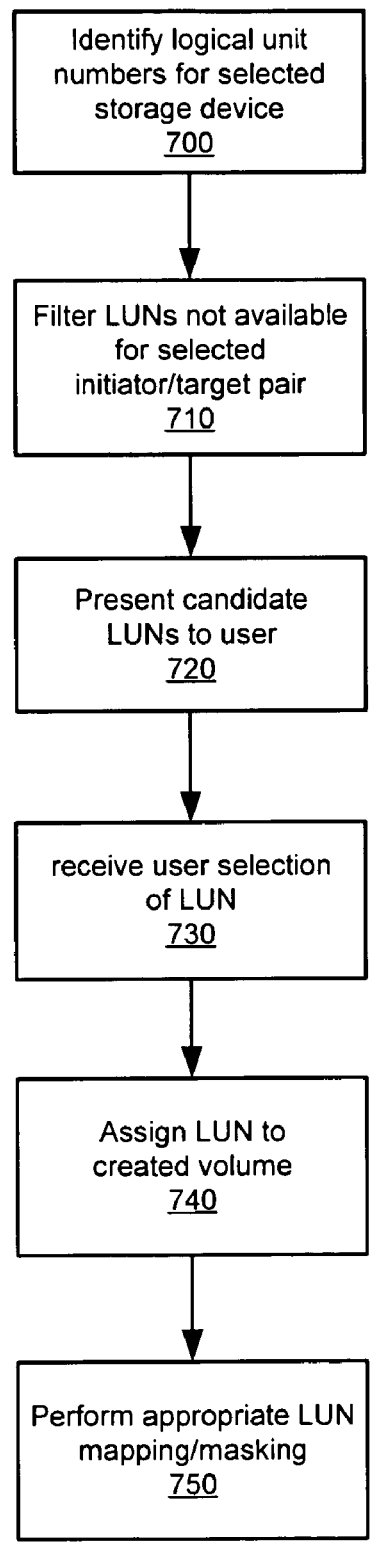
FIG. 7 is a flowchart for a method of selecting a LUN to assign to a storage volume and performing LUN mapping and/or masking, according to one embodiment.

The combination of the initiator and target ports selected above may define a communication channel. The host may use the channel to communicate with multiple logical units included in the target device and designated by a logical unit number (LUN). FIG. 7 is a flowchart for a method of selecting a LUN to assign to a storage volume and performing LUN mapping and/or masking, according to one embodiment. At block 700, the host-centric storage provisioner may identify available LUNs on the selected storage device for the created volume. This LUN list may be contextualized for the host by filtering any LUN that is already associated with the communication channel, as shown in block 710. The contextualized LUN list may be presented to the user for his selection, as indicated in blocks 720 and 730. At 740, the storage provisioner may assign the selected LUN to the created storage volume on the target device. To prevent unauthorized access to the newly created storage volume, the host-centric storage provisioner may perform LUN mapping/masking on all system hosts that can access the target storage device, as indicated in block 750.

In one embodiment, zoning may provide a logical separation of traffic flow between hosts and resources. In this way zoning a SAN may enable several advantageous administrative functions. First, by breaking up a network into zones, processing activity may be distributed evenly across a network so that no single device is overburdened. Second, zoning may ensure that each user has his own dedicated space reserved on the file server. Third, if a SAN contains more than one operating system servers with conflicting operating systems might be able to write to each other's native file system, inviting data corruption. This potentiality may be overcome through proper SAN zoning. Likewise zoning may assist in implementing network security by restricting user access to resources within his zone or zones.

Figure 8:
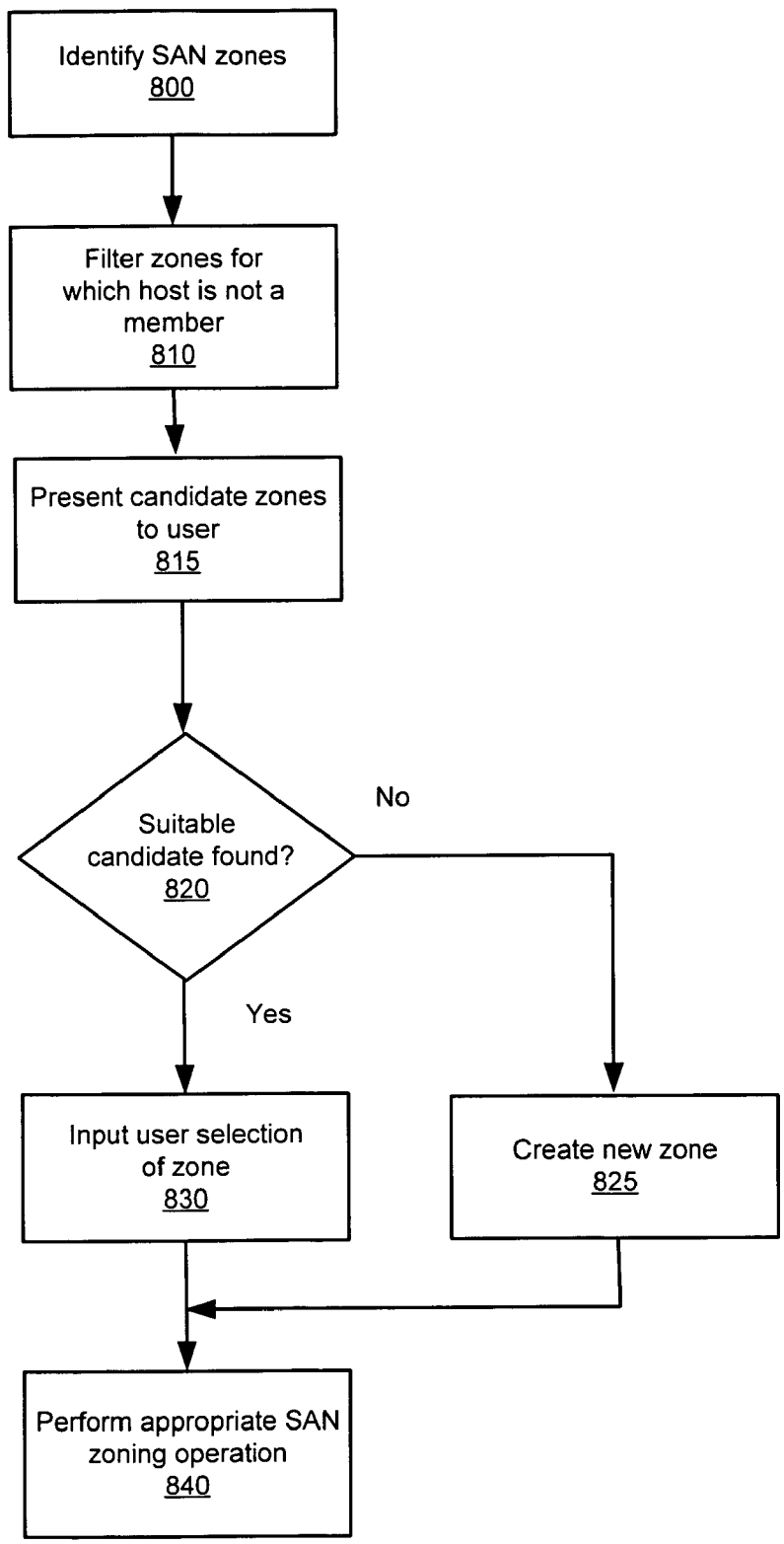
FIG. 8 is a flowchart for zoning a SAN in response to storage consumer-centric storage provisioning, according to one embodiment.

FIG. 8 is a flowchart for zoning a SAN in response to storage consumer-centric storage provisioning, according to one embodiment. At 800 the host-centric storage provisioner may identify all established zones within the SAN. As described above, these zones may be established for network flow control/load balancing, data integrity, security, or other network management reasons. In one embodiment, the storage provisioner may contextualize the zone data with respect to the storage consumer/host by eliminating those zones, which are not available to the host, as indicated in block 810 In some embodiments, the storage provisioner may present the contextualized zoning information to the user, as shown in block 815. If a suitable candidate zone is available, as determined at decision block 820 the user may specify a zone in which to include both the host and the storage device including the newly-provisioned volume, as indicated by block 830. If, after filtering the zones, no existing zone is found to meet the requirements, the storage provisioner may create a new zone with the initiator and target ports as members, as illustrate in block 825. The host-centric storage provisioner may then perform the appropriate SAN zoning operations to implement the requested configuration, as illustrated in block 840. In an alternative embodiment, the storage provisioner may include sufficient zoning rules for the SAN such that once the host/consumer and providing storage device are identified, it can perform the necessary zoning operations without further input from the user.

Figure 9:
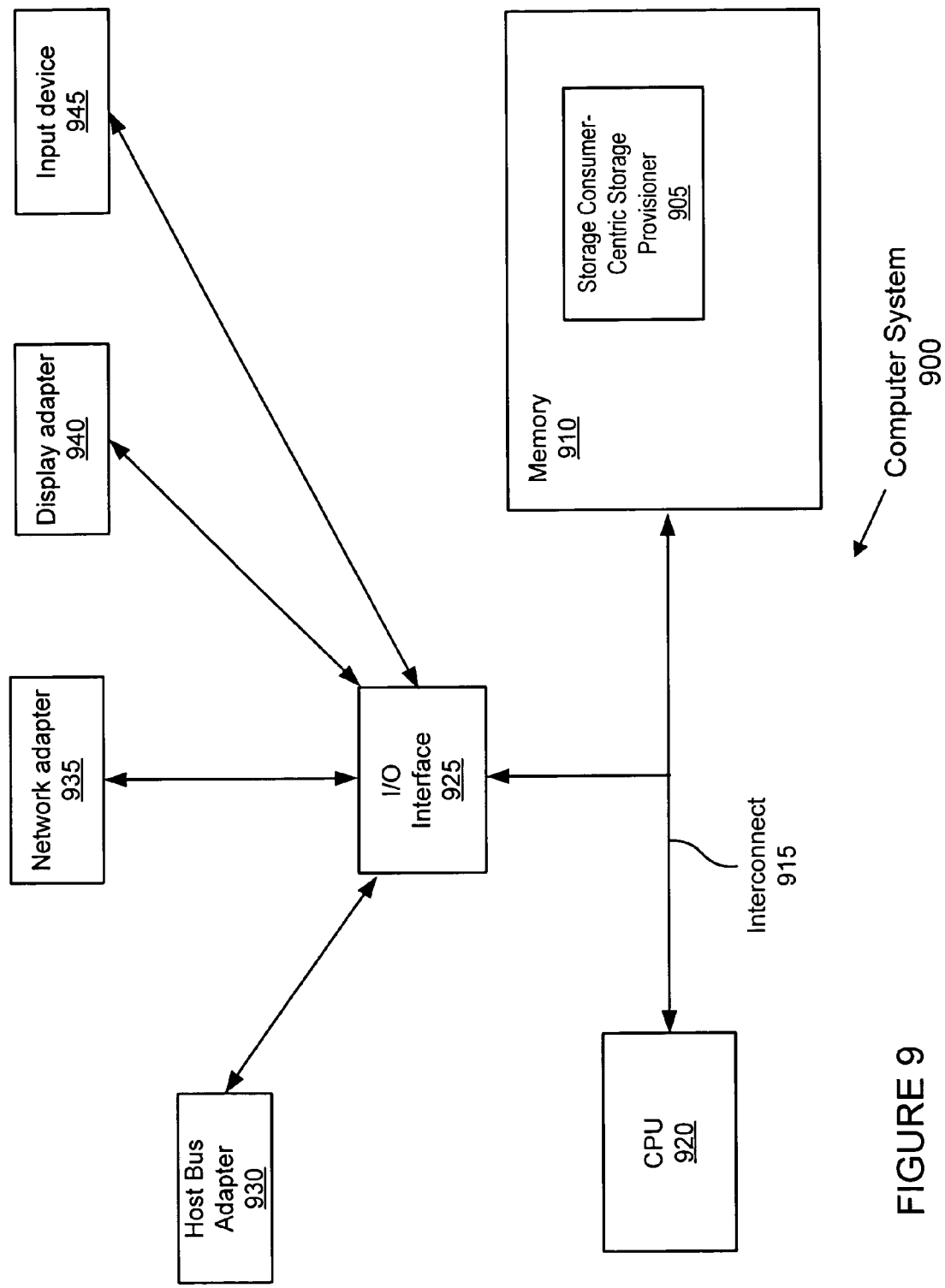
FIG. 9 illustrates one embodiment of a computer system that may include a storage consumer-centric storage provisioner as described herein.

FIG. 9 illustrates one embodiment of a computer system 900 that may include a storage consumer-centric storage provisioner 905 as described herein. Computer system 900 may include many different components such as memory 910, a central processing unit (CPU) or processor 920, and an input/output (I/O) interface 925. Interconnect 915 is relied upon to communicate data from one component to another. For example, interconnect 915 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 900 preferably includes a memory medium on which computer programs according to various embodiments may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive, or optical storage located either locally to computer system 900 or coupled through a SAN. In the latter case, computer system 900 may be coupled to the SAN by means of host bus adapter 930. In other embodiments, the memory medium may include other types of memory as well, or combinations thereof. In addition, the memory medium may be located in a first computer in which the programs are executed, or may be located in a second different computer, which connects to the first computer over a network through network adapter 935. In the latter instance, the second computer provides the program instructions to the first computer for execution.

Also, the computer system 900 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 910 may store program instructions accessed by the CPU 920. For example, instructions and data implementing a storage consumer-centric storage provisioner 905 may be stored in memory 910. Storage consumer-centric storage provisioner 905 may be configured to enable a user to provision computer system 900 with SAN-coupled storage efficiently and without the need for using multiple, disparate tools.

Computer system 900 may further include other software and hardware components, such as an input/output (I/O) interface 925, that may be coupled to various other components and memory 910. The CPU 920 may acquire instructions and/or data through the I/O interface 925. Through the I/O interface 925, the CPU 920 may also be coupled to one or more I/O components. As illustrated, I/O components may include a host bus adapter 930, a network adapter 935, a display adapter 940 and/or an input device 945. Some components 930 to 945 may be coupled to the I/O interface 925. In addition, the computer system 900 may include one or more of a particular type of component. The computer system 900 may include one or more components coupled to the system through a component other than the I/O interface 925. Some computer systems may include additional and/or other components such as application software (e.g., stored in memory 910), other CPUs, video monitors or other displays, track balls, mice, keyboards, printers, plotters, scanners, or other types of I/O devices for use with computer system 900.

Various embodiments may further include receiving, sending or storing instructions and/or data implemented in accordance with the foregoing description upon a computer readable medium. Generally speaking, a computer readable medium may include storage media or memory media (such as magnetic or optical media, e.g., disk or CD-ROM, volatile or non-volatile media such as RAM (e.g. SDRAM, DDR SDRAM, RDRAM, SRAM, etc.), ROM, etc.), as well as transmission media or signals (such as electrical, electromagnetic, or digital signals, conveyed via a communication medium such as network and/or a wireless link).

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a storage consumer;
   a plurality of storage devices;
   one or more SAN fabrics each comprising one or more fabric devices configured to couple the storage consumer to the plurality of storage devices; and
   a storage consumer-centric storage provisioner, wherein to provide the storage consumer with storage comprised in the plurality of storage devices, the storage consumer-centric storage provisioner is configured to:
      acquire system data comprising topologic information and characteristics of the storage consumer, the plurality of storage devices and the SAN fabric devices;
      contextualize the system data into a perspective of the storage consumer to produce candidate system configuration parameters, wherein to contextualize the system data, the consumer-centric storage provisioner is configured to disregard data associated with system components not available to the storage consumer;
      present the candidate system configuration parameters to a user;
      receive user selection of a set of the candidate system configuration parameters; and
      configure the system based upon the user selection.

2. The system as recited in claim 1, wherein the storage consumer is a host system and the storage provisioner is configured to contextualize the system data into a perspective of the host system.

3. The system as recited in claim 1, wherein the storage consumer is an application and the storage provisioner is configured to contextualize the system data into a perspective of the application.

4. The system as recited in claim 1, wherein the storage consumer is a server cluster and the storage provisioner is configured to contextualize the system data into a perspective of the server cluster.

5. The system as recited in claim 1, wherein to provide the storage consumer with storage, the storage provisioner is further configured to:
   determine the storage consumer;
   determine a storage device to service the storage consumer;
   determine an initiator port on the storage consumer and target port on the storage device;
   determine a LUN for the storage device; and
   determine a zone for the storage consumer and storage device.

6. The system as recited in claim 5, wherein to determine the storage consumer, the storage provisioner is further configured to:
   identify hosts;
   filter hosts not connected to the SAN;
   present hosts connected to the SAN to the user; and
   input user selection of the host.

7. The system as recited in claim 5, wherein to determine the storage device, the storage provisioner is further configured to:
   identify the storage devices;
   filter storage devices not connected to the storage consumer;
   present characteristics of candidate storage devices to the user;
   input user selection of storage device characteristics;
   identify candidate storage devices providing selected characteristics;
   input user selection of storage device; and
   create a volume with selected storage characteristics on identified storage device.

8. The system as recited in claim 5, wherein to determine the initiator and target ports, the storage provisioner is further configured to:
   identify initiator ports of the storage consumer;
   filter initiator ports unavailable in the storage consumer;
   present candidate initiator ports to the user;
   input user selection of initiator port;
   identify target ports on selected storage device;
   filter target ports not connected to selected initiator port;
   present candidate target ports to the user; and
   input user selection of target port.

9. The system as recited in claim 5, wherein to determine the LUN, the storage provisioner is further configured to:
   identify logical unit numbers (LUN) of a selected storage device;
   filter LUNs unavailable for a selected port pair;
   present candidate LUNs to the user;
   input user selection of one of the candidate LUNs;
   assign the selected LUN to a created volume; and
   map/mask LUNs of selected storage device accordingly for the storage consumer.

10. The system as recited in claim 5, wherein to determine the zone the storage provisioner is further configured to:
    identify world wide numbers for selected ports;
    identify SAN zones;
    filter zones for which the storage consumer is not a member;
    present candidate zones to the user;
    input user selection of zone if a suitable zone exits;
    create new zone if no suitable existing zone; and
    perform appropriate SAN zoning.

11. A method for providing a storage consumer with storage, comprising:
    acquiring system data comprising topologic information on the system and characteristics of the storage consumer, a plurality of storage devices, and SAN fabric devices;
    contextualizing the system data into a perspective of the storage consumer to produce candidate system configuration parameters, wherein contextualizing the system data comprises disregarding data associated with system components not accessible by or available to the storage consumer;
    presenting the candidate system configuration parameters to a user;
    receiving user selection of a set of the candidate system configuration parameters; and
    configuring the system based upon the user selection.

12. The method as recited in claim 11, wherein the storage consumer is a host system and said contextualizing comprises contextualizing the system data into a perspective of the host system.

13. The method as recited in claim 11, wherein the storage consumer is an application and said contextualizing comprises contextualizing the system data into a perspective of the application.

14. The method as recited in claim 11, wherein the storage consumer is a server cluster and said contextualizing comprises contextualizing the system data into a perspective of the server cluster.

15. The method as recited in claim 11, wherein said providing further comprises:
   determining the storage consumer;
   determining a storage device to service the storage consumer;
   determining an initiator port on the storage consumer and target port on the storage device;
   determining a LUN for the storage device; and
   determining a zone for the storage consumer and storage device.

16. The method as recited in claim 15, wherein determining the storage consumer comprises:
   identifying hosts;
   filtering hosts not connected to the SAN;
   presenting hosts connected to the SAN to the user; and
   inputting user selection of the host.

17. The method as recited in claim 15, wherein determining the storage device comprises:
   identifying the storage devices;
   filtering storage devices not connected to the storage consumer;
   presenting characteristics of candidate storage devices to the user;
   inputting user selection of storage device characteristics;
   identifying candidate storage devices providing selected characteristics;
   inputting user selection of storage device; and
   creating a volume with selected storage characteristics on identified storage device.

18. The method as recited in claim 15, wherein determining the initiator port on the storage consumer and target port on the storage device comprises:
   identifying initiator ports of the storage consumer;
   filtering initiator ports unavailable in the storage consumer;
   presenting candidate initiator ports to the user;
   inputting user selection of initiator port;
   identifying target ports on selected storage device;
   filtering target ports not connected to selected initiator port;
   presenting candidate target ports to the user; and
   inputting user selection of target port.

19. The method as recited in claim 15, wherein determining the LUN for the storage device comprises:
   identifying logical unit numbers (LUN) of selected storage device;
   filtering LUNs unavailable for a selected port pair;
   presenting candidate LUNs to the user;
   inputting user selection of one of the candidate LUNs;
   assigning the selected LUN to a created volume; and
   mapping/masking LUNs of selected storage device accordingly for the storage consumer.

20. The method as recited in claim 15, wherein determining the zone for the storage consumer and storage device comprises:
   identifying world wide numbers for selected ports;
   identifying SAN zones;
   filtering zones for which host is not a member;
   presenting candidate zones to the user;
   inputting user selection of zone if a suitable zone exits;
   creating a new zone if no suitable existing zone; and
   performing appropriate SAN zoning.

21. A computer readable storage medium storing program instructions, wherein the program instructions are computer-executable to:
   acquire system data comprising topologic information on a system and characteristics of a storage consumer, a plurality of storage devices and SAN fabric devices;
   contextualize the system data into a perspective of the storage consumer to produce sets of candidate system configuration parameters, wherein to contextualize the system data, the consumer-centric storage provisioner is configured to disregard data associated with system components not available to the storage consumer;
   present the candidate system configuration parameters to a user;
   receive user selection of a set of the candidate system configuration parameters; and
   configure the system based upon the user selection.

22. The computer readable storage medium as recited in claim 21, wherein the storage consumer is a host system and to contextualize comprises contextualizing the system data into a perspective of the host system.

23. The computer readable storage medium as recited in claim 21, wherein the storage consumer is an application and to contextualize comprises contextualizing the system data into a perspective of the application.

24. The computer readable storage medium as recited in claim 21, wherein the storage consumer is a server cluster and to contextualize comprises contextualizing the system data into a perspective of the server cluster.

25. The computer readable storage medium as recited in claim 21, wherein the program instructions are further computer-executable to:
   determine the storage consumer;
   determine a storage device to service the storage consumer;
   determine an initiator port on the storage consumer and target port on the storage device;
   determine a LUN for the storage device; and
   determine a zone for the storage consumer and storage device.

26. The computer readable storage medium as recited in claim 25, wherein to determine the storage consumer, the program instructions are further computer-executable to:
   identify hosts;
   filter hosts not connected to the SAN;
   present hosts connected to the SAN to the user; and
   input user selection of the host.

27. The computer readable storage medium as recited in claim 25, wherein to determine the storage device, the program instructions are further computer-executable to:
   identify the storage devices;
   filter storage devices not connected to the storage consumer;
   present characteristics of candidate storage devices to the user;
   input user selection of storage device characteristics;
   identify candidate storage devices providing selected characteristics;
   input user selection of storage device; and
   create a volume with selected storage characteristics on identified storage device.

28. The computer readable storage medium as recited in claim 25, wherein to determine the initiator and target ports, the program instructions are further computer-executable to:
- identify initiator ports of the storage consumer;
- filter initiator ports unavailable in the storage consumer;
- present candidate initiator ports to the user;
- input user selection of initiator port;
- identify target ports on selected storage device;
- filter target ports not connected to selected initiator port;
- present candidate target ports to the user; and
- input user selection of target port.

29. The computer readable storage medium as recited in claim 25, wherein to determine the LUN, the program instructions are further computer-executable to:
- identify logical unit numbers (LUN) of selected storage device;
- filter LUNs unavailable for a selected port pair;
- present candidate LUNs to the user;
- input user selection of one of the candidate LUNs;
- assign selected LUN to a created volume; and
- map/mask LUNs of selected storage device for the storage consumer.

30. The computer readable storage medium as recited in claim 25, wherein to determine the zone, the program instructions are further computer-executable to:
- identify world wide numbers for selected ports;
- identify SAN zones;
- filter zones for which host is not a member;
- present candidate zones to the user;
- input user selection of zone if a suitable zone exits;
- create new zone if no suitable existing zone; and
- perform appropriate SAN zoning.

* * * * *

UNITED STATES PATENT AND TRADEMARK OFFICE
CERTIFICATE OF CORRECTION

PATENT NO. : 7,657,613 B1  Page 1 of 1
APPLICATION NO. : 10/937184
DATED : February 2, 2010
INVENTOR(S) : Hanson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1343 days.

Signed and Sealed this

Thirtieth Day of November, 2010

David J. Kappos
*Director of the United States Patent and Trademark Office*